(12) United States Patent
Watanabe et al.

(10) Patent No.: US 8,647,595 B2
(45) Date of Patent: Feb. 11, 2014

(54) METHOD FOR SEPARATING RADIOACTIVE COPPER USING CHELATING-ION EXCHANGE RESIN

(75) Inventors: Shigeki Watanabe, Gunma (JP); Noriko Ishioka, Gunma (JP)

(73) Assignee: Japan Atomic Energy Agency, Ibaraki (JP)

( * ) Notice: Subject to any disclaimer, the term of this patent is extended or adjusted under 35 U.S.C. 154(b) by 0 days.

(21) Appl. No.: 13/001,861

(22) PCT Filed: Jun. 17, 2009

(86) PCT No.: PCT/JP2009/061020
§ 371 (c)(1),
(2), (4) Date: Mar. 2, 2011

(87) PCT Pub. No.: WO2010/001728
PCT Pub. Date: Jan. 7, 2010

(65) Prior Publication Data
US 2011/0142735 A1 Jun. 16, 2011

(30) Foreign Application Priority Data
Jun. 30, 2008 (JP) ................................ 2008-171032

(51) Int. Cl.
*C01F 13/00* (2006.01)
(52) U.S. Cl.
USPC ................................. 423/2; 423/24
(58) Field of Classification Search
USPC ........................................ 423/2, 24
See application file for complete search history.

(56) References Cited

FOREIGN PATENT DOCUMENTS

| JP | 52-106099 | 9/1977 |
| JP | 61-283605 | 12/1986 |
| JP | 2-47699 | 2/1990 |

OTHER PUBLICATIONS

Fan, Xianfeng, A simple and selective method for the separation of Cu radioisotopes from nickel, Nuclear Medicine and Biology, vol. 33, Issue 7 (939-944), Oct. 2006.*
International Search Report issued Jul. 14, 2009 in International (PCT) Application No. PCT/JP2009/061020.
Xiaolin Hou et al., "Separation of no-carrier-added $^{64}$Cu from a proton irradiated $^{64}$Ni enriched nickel target," Applied Radiation and Isotopes, vol. 57, pp. 773-777, 2002.

* cited by examiner

*Primary Examiner* — Melvin C Mayes
*Assistant Examiner* — Melissa Stalder
(74) *Attorney, Agent, or Firm* — Wenderoth, Lind & Ponack, L.L.P.

(57) ABSTRACT

Disclosed is a method for rapidly separating radioactive copper from nickel that contains radioactive copper and radioactive cobalt, which comprises dissolving nickel that contains radioactive copper and radioactive cobalt in an acid solution and leading it to pass through a chelating-ion exchange resin-filled column to thereby make nickel, radioactive copper and radioactive cobalt held by the chelating-ion exchange resin, and then leading an acid solution to pass through the chelating-ion exchange resin-filled column to elute nickel and radioactive cobalt, and thereafter leading an acid solution having a higher concentration than that of the previous acid solution to pass through the chelating-ion exchange resin-filled column after nickel and radioactive elution therefrom to thereby elute radioactive copper.

1 Claim, 2 Drawing Sheets

Fig. 2
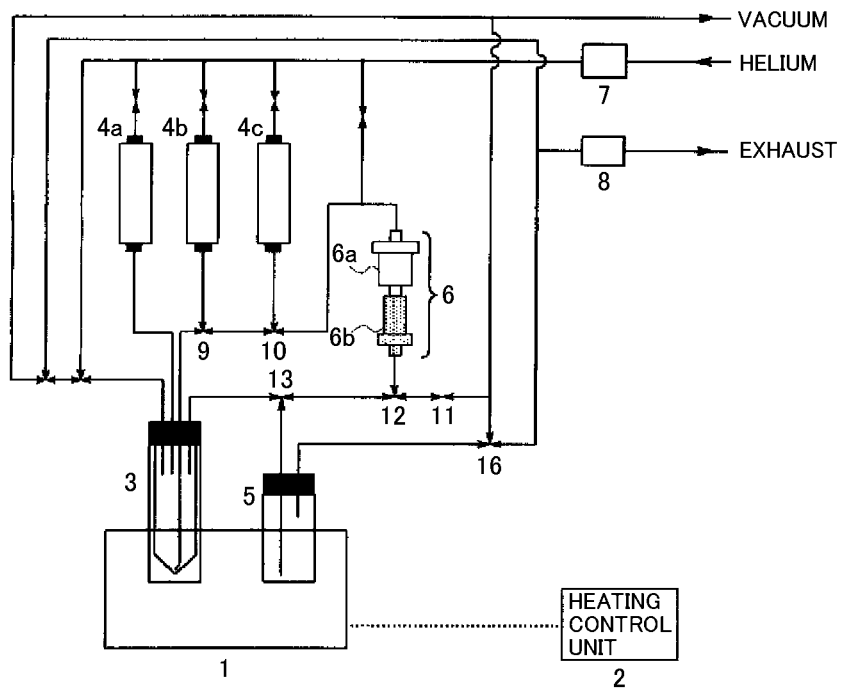
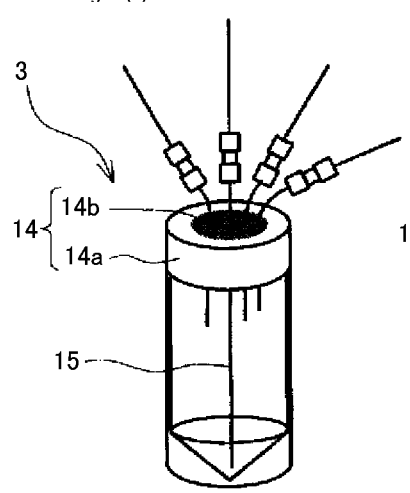
Fig. 3(a)
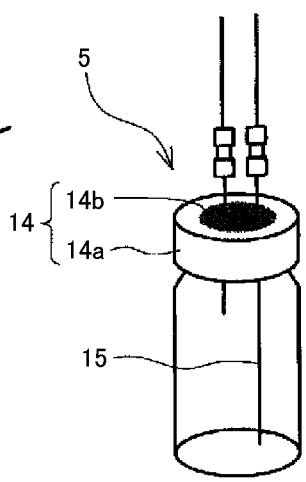
Fig. 3(b)

METHOD FOR SEPARATING RADIOACTIVE COPPER USING CHELATING-ION EXCHANGE RESIN

TECHNICAL FIELD

The present invention relates to a method for separating radioactive copper using a chelating-ion exchange resin.

BACKGROUND ART

Heretofore for production of copper radionuclide (hereinafter this may be referred to as radioactive copper) such as Cu-60, Cu-61, Cu-62, Cu-64, Cu-67 and others, there is known a method comprising irradiating a nickel target of a stable nickel isotope with proton, deuteron or alpha-particle beams to produce radioactive copper thereby chemically separating/purifying the radioactive copper contained in the nickel target (see Patent Reference 1, Non-Patent Reference 1). For example, Non-Patent Reference 1 reports a method of dissolving an irradiated $^{64}$Ni target in concentrated hydrochloric acid followed by leading the resulting solution to pass through an anion exchange resin to separate radioactive copper. Non-Patent Reference 2 proposes a Cu-64 production apparatus using the method of Non-Patent Reference 1, in which production of Cu-64 within 3 hours is reported.

Irradiation of a $^{64}$Ni target with proton beams produces radioactive copper and, as by-products, cobalt radionuclides (hereinafter this may be referred to as radioactive cobalt) such as Co-55, Co-56, Co-57, Co-58, etc. Accordingly, for obtaining the intended radioactive copper at high purity, nickel and cobalt radionuclides must be removed. Non-Patent Reference 3 reports, as a modification of the method of Non-Patent Reference 1, a method of separating radioactive copper by dissolving an irradiated $^{64}$Ni target in an ethanol solution containing 0.3 mol/L of hydrochloric acid followed by leading the resulting solution to pass through an anion exchange resin.

[Patent Reference 1] JP-T 2007-512118
[Non-Patent Reference 1] D. W. McCarthy et al., Nucl. Med. Biol., 24, 35-43 (1997)
[Non-Patent Reference 2] A. Obata et al., Nucl. Med. Biol., 30, 535-539 (2003)
[Non-Patent Reference 3] X. Hou et al., Appl. Radiat. Isot., 57, 773-777 (2002)

DISCLOSURE OF INVENTION

However, in the separation method using an anion exchange resin, by-products of radioactive cobalt are difficult to separate; and for separating high-purity radioactive copper, a large amount of an anion exchange resin must be used and the contact time with the resin must be prolonged. As a result, there are problems in that (1) much time is taken for separation, and with that, (2) the radiation dosage to operators increases, (3) a large quantity of aqueous hydrochloric acid solution is needed for separation, and (4) the scale of the apparatus is relatively large and the installation thereof inside a radiation-shielding cell is limited.

The invention has been made in consideration of the above-mentioned situation, and its object is to provide a method for separating radioactive copper using a chelating-ion exchange resin and capable of rapidly separating radioactive copper.

The method for separating radioactive copper using a chelating-ion exchange resin of the invention is, for solving the above-mentioned problems, characterized by the following.

First, the invention is a method for separating radioactive copper from nickel that contains radioactive copper and radioactive cobalt, which comprises dissolving nickel that contains radioactive copper and radioactive cobalt in an acid solution and leading it to pass through a chelating-ion exchange resin-filled column to thereby make nickel, radioactive copper and radioactive cobalt held by the chelating-ion exchange resin, and then leading an acid solution to pass through the chelating-ion exchange resin-filled column to elute nickel and radioactive cobalt, and thereafter leading an acid solution having a higher concentration than that of the previous acid solution to pass through the chelating-ion exchange resin-filled column after nickel and radioactive elution therefrom to thereby elute radioactive copper.

Secondly, the acid solution to dissolve nickel that contains radioactive copper and radioactive cobalt, and the acid solution to elute nickel and radioactive cobalt are hydrochloric acid or nitric acid of from 0.25 to 0.06 mol/L, or sulfuric acid of from 0.12 to 0.03 mol/L.

Thirdly, the acid solution to elute radioactive copper after elution of nickel and radioactive cobalt is hydrochloric acid or nitric acid having a concentration of at least 0.5 mol/L, or sulfuric acid having a concentration of at least 0.25 mol/L.

BRIEF DESCRIPTION OF DRAWINGS

FIG. 2 is a schematic view of a separation apparatus for radioactive copper using a chelating-ion exchange resin.

FIG. 3(a) is a perspective view of the heating chamber in the separation apparatus of FIG. 2; and FIG. 3(b) is a perspective view of the chamber therein.

BEST MODE FOR CARRYING OUT THE INVENTION

Figure 1:
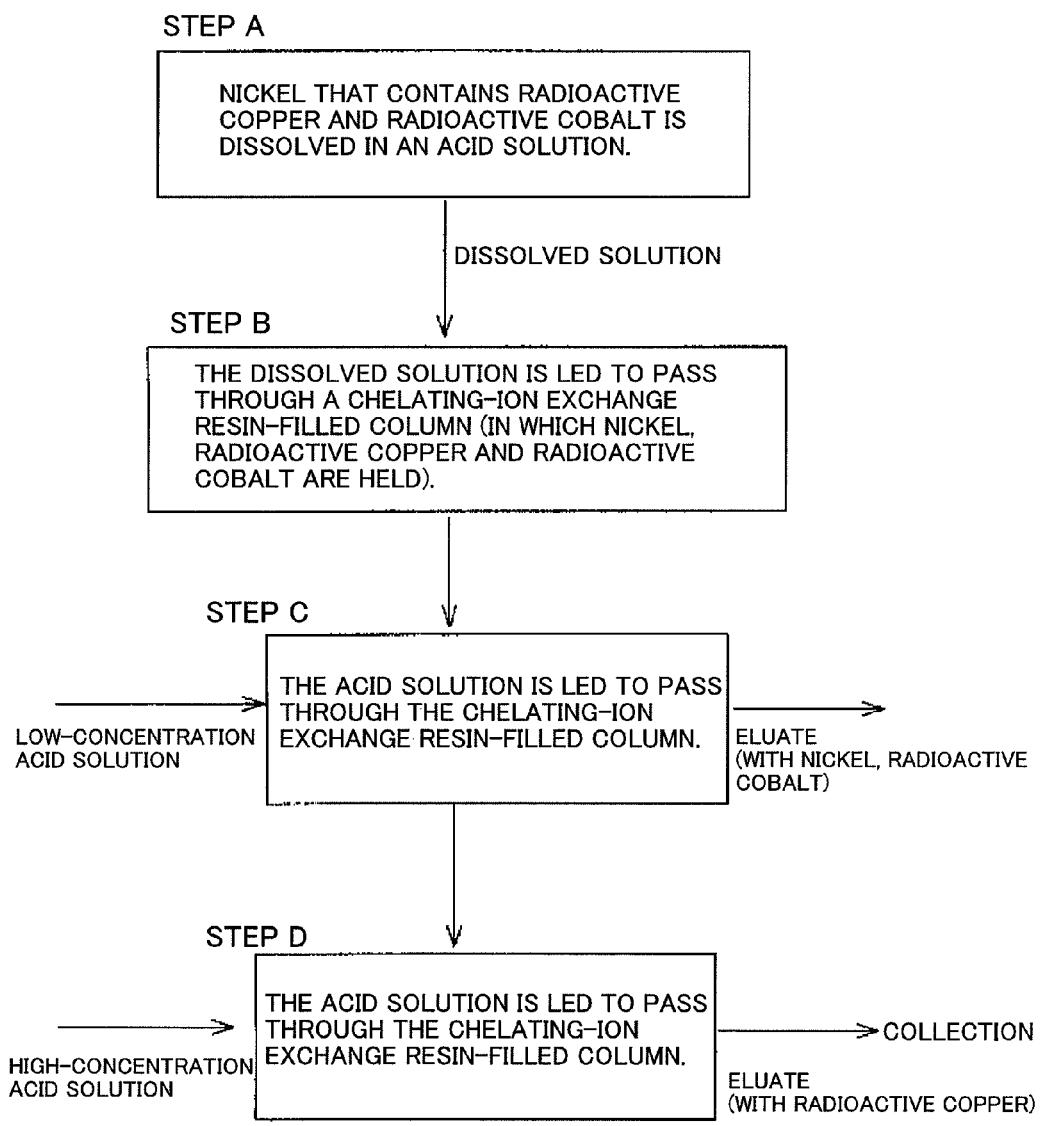
FIG. 1 is a flowchart showing a process of separating radioactive copper using a chelating-ion exchange resin.

The invention is characterized by the above, in which, in particular, use of a chelating-ion exchange resin is important for separation of radioactive copper from nickel that contains radioactive copper and radioactive cobalt. Examples of general application with chelating-ion exchange resins heretofore known in the art are for concentration/collection of minor metals in river water or seawater, removal of minor metals from analyte solvents, etc. Copper can be held by chelating-ion exchange resin under any condition of acidic to neutral to basic atmospheres, and therefore chelating-ion exchange resin is often utilized especially for concentration/recovery or removal of copper from samples; however, there is known no example of separation of copper from transition metals such as cobalt, nickel, etc. This is because it has heretofore been considered that the condition of the acid solution for separation is difficult to set and separation of copper from transition metals would be difficult. Regarding separation of radioactive copper, Patent Reference 1 and Non-Patent Reference 1 report a method of separating radioactive copper by dissolving an irradiated $^{64}$Ni target in concentrated hydrochloric acid followed by leading the resulting solution to pass through an anion exchange resin, as described in the above. However, in fact, irradiated $^{64}$Ni target contains radioactive cobalt formed therein; and Non-Patent Reference 3 reports that separation of radioactive copper from radioactive cobalt is difficult. Given the situation, the present inventors have assiduously studied for realizing separation of radioactive copper from nickel that contains radioactive copper and radioactive cobalt, and have specifically noted chelating-ion exchange resins and completed the present invention. The best mode for carrying out the invention is described below.

FIG. 1 is a flowchart showing a process of separating radioactive copper using a chelating-ion exchange resin. With reference to FIG. 1, one embodiment of the separation method for radioactive copper using a chelating-ion exchange resin of the invention is described below.

In the step A in FIG. 1, an acid solution is added to nickel that contains radioactive cobalt and radioactive copper to dissolve it therein. In this, "radioactive cobalt" is a cobalt radioisotope of Co-55, Co-56, Co-57, Co-58, etc.; and "radioactive copper" is a copper radioisotope of Cu-60, Cu-61, Cu-62, Cu-64, Cu-67, etc. "Nickel that contains radioactive cobalt and radioactive copper" includes, for example, one prepared by irradiating a stable nickel isotope of a target substance with accelerated proton, deuteron or alpha (helium) particles to thereby form radioactive copper and radioactive cobalt, or nickel chloride prepared by dissolving the target substance in which radioactive copper and radioactive cobalt have been formed, in hydrogen peroxide-containing hydrochloric acid followed by evaporating to dryness, or nickel nitrate or nickel sulfate prepared by using nitric acid or sulfuric acid in place of hydrochloric acid. As the target substance, usable is one prepared through Ni metal electrodeposition or NiO.

The acid solution to dissolve nickel that contains radioactive cobalt and radioactive copper is, for example, hydrochloric acid or nitric acid of from 0.25 to 0.06 mol/L, more preferably from 0.2 to 0.08 mol/L, even more preferably from 0.15 to 0.1 mol/L, or sulfuric acid of from 0.12 to 0.03 mol/L, more preferably from 0.1 to 0.04 mol/L, even more preferably from 0.07 to 0.05 mol/L. Using the acid solution having the concentration range secures the chelating-ion exchange resin to hold nickel, radioactive copper and radioactive cobalt in the step B to be mentioned below, and in particular, enables the resin to preferentially hold radioactive copper. Using hydrochloric acid or nitric acid having a higher concentration than 0.25 mol/L is unfavorable as bringing about the possibility of elution of copper along with nickel and radioactive cobalt. Using the acid solution having a lower concentration than 0.06 mol/L brings about the possibility that nickel and radioactive cobalt could not be eluted as kept held in the chelating-ion exchange resin-filled column to be mentioned below, and this may bring about a problem in that nickel and radioactive cobalt would mix in the eluate of radioactive copper in a high-concentration acid solution thereby greatly lowering the purity of radioactive copper therein. Accordingly, for selectively eluting nickel and radioactive cobalt alone, the concentration range of hydrochloric acid or nitric acid is preferably from 0.25 to 0.06 mol/L. For the same reason, the concentration range of sulfuric acid is preferably from 0.12 to 0.03 mol/L.

The combination of nickel that contains radioactive cobalt and radioactive copper and the acid solution to dissolve it is not specifically defined, but for effectively separating radioactive copper, nickel that contains radioactive cobalt and radioactive copper is preferably dissolved in an acid solution at high solubility; and as the preferred combination, for example, there may be illustrated nickel chloride and hydrochloric acid, nickel nitrate and nitric acid, and nickel sulfate and sulfuric acid.

In this step, nickel that contains radioactive cobalt and radioactive copper is dissolved in a small amount of an acid solution, for example, in from 0.5 to 2 mL of an acid solution.

In the step B, the dissolved solution prepared by dissolving nickel that contains radioactive cobalt and radioactive copper in an acid solution in the step A is kept in contact with the chelating-ion exchange resin-filled in a column (charging). In this step, the dissolved solution to be charged in the column is the dissolved solution in from 0.5 to 2 mL of an acid solution as described in the above; and since its volume is small, it is in the form existing in the column. Accordingly, nickel, radioactive copper and radioactive cobalt can be effectively adsorbed and held by the chelating-ion exchange resin.

The chelating-ion exchange resin may be any chelating-ion exchange resin capable of adsorbing nickel, radioactive copper and radioactive cobalt. As the chelating-ion exchange resin of the type, usable is any one heretofore used for concentration/collection of minor nickel, copper and cobalt existing in food digested materials or environmental samples such as river water, seawater or the like, or for removing nickel, copper and cobalt existing in assay samples; and by changing the pH of the solution, the resin can selectively trap and elute copper alone. As concrete examples, there may be mentioned resins and solid-phase fillers prepared by introducing an aminocarboxylic acid such as iminodiacetic acid, ethylenediamine-triacetic acid or the like that serves as a coordinating group capable of forming a chelate with nickel, radioactive copper and radioactive cobalt, into a styrenic polymer resin such as styrene-divinylbenzene copolymer or the like, or an acrylate-based polymer resin such as methacrylate polymer or the like (matrix).

In the step C, an acid solution is led to pass through the chelating-ion exchange resin-filled column in which nickel, radioactive copper and radioactive cobalt are held. Accordingly, nickel and radioactive cobalt alone are eluted. Preferably, the acid solution to be used here has a low concentration, and for example, like the acid solution used in the step A, herein usable is hydrochloric acid or nitric acid of from 0.25 to 0.06 mol/L, more preferably from 0.2 to 0.08 mol/L, even more preferably from 0.15 to 0.1 mol/L, or sulfuric acid of from 0.12 to 0.03 mol/L, more preferably from 0.1 to 0.04 mol/L, even more preferably from 0.07 to 0.05 mol/L. Use of hydrochloric acid or nitric acid having a higher concentration than 0.25 mol/L is unfavorable as bringing about a possibility that copper may also be eluted along with nickel and radioactive cobalt. Use of an acid solution having a lower concentration than 0.06 mol/L may bring about a possibility that nickel and radioactive cobalt would be kept held by the chelating-ion exchange resin-filled column to be mentioned below, and could not be eluted, therefore causing a problem in that nickel and radioactive cobalt would mix in the elution of radioactive copper with a high-concentration acid solution to thereby greatly lower the purity of radioactive copper. Accordingly, for selective elution of nickel and radioactive cobalt alone, the concentration range of hydrochloric acid or nitric acid is preferably from 0.25 to 0.06 mol/L. For the same reasons, the concentration range of sulfuric acid is preferably from 0.12 to 0.03 mol/L.

In the step D, a high-concentration acid solution is led to pass through the chelating-ion exchange resin-filled column after elution of nickel and radioactive cobalt. Accordingly, radioactive copper kept held by the chelating-ion exchange resin is eluted. In this, radioactive copper alone is eluted in the acid solution, and radioactive copper can be separated by collecting the eluate, and the intended radioactive copper may be thereby obtained. The acid solution for use in the step D is an acid solution having a higher concentration than that of the acid solution used in the step A and the step C. For example, herein usable is hydrochloric acid or nitric acid having a concentration of at least 0.5 mol/L, or sulfuric acid having a concentration of at least 0.25 mol/L. Use of hydrochloric acid or nitric acid having a concentration of less than 0.5 mol/L is unfavorable as causing a problem in that radioactive copper would be kept held in the column and could not be eluted. For the same reason, use of sulfuric acid having a concentration of less than 0.25 mol/L is unfavorable. Not specifically defined, the uppermost limit may be any available one that would not have any negative influence on the apparatus.

The invention has been described in the above with reference to its embodiments; however, the invention is not limited to the embodiments, and not overstepping the scope and the spirit thereof, various modifications can be made therein. Examples of the invention are described concretely hereinunder.

EXAMPLES

Example 1

FIG. 2 is a schematic view of a separation apparatus for radioactive copper using a chelating-ion exchange resin.

First, as the target, used was 150 mg of $^{64}$NiO, enriched nickel stable isotope (degree of enrichment, 99.6%), and this was irradiated with proton beams having an incident energy of 11 MeV (beam current value, 5 μA) for 1 hour to form radioactive copper ($^{64}$Cu) and radioactive cobalt. Next, the irradiated $^{64}$NiO was put into the heating chamber 3, and hydrogen peroxide-containing hydrochloric acid was added to the heating chamber 3 from the solvent reservoir 4a with its flow rate kept controlled by the mass flow controller 7 under helium pumping thereinto. The heating chamber 3 for use herein is made of quartz. Accordingly, for example, when production of radioactive copper-labeled chemical reagents and the like for use in the field of medicine is taken into consideration, contamination with impurities to interfere with the production of radioactive copper-labeled chemical reagents could be minimized. As in FIG. 3(a), this has a V-shaped bottom, therefore enabling efficient collection of solution. The heating apparatus 1 has a hollow space in accordance with the shape of the heating chamber 3, therefore enabling efficient heating therein. The cover 14 (cap) is a combination of a holed cap 14a and a butyl septum 14b, in which a liquid feeding tube 15 such as syringe, PEEK tube or the like can be directly inserted into the butyl septum 14b, and in which liquid feeding and evaporation to dryness under reduced pressure can be attained without opening the heating chamber 3.

Next, the heating temperature in the heating apparatus 1 was is controlled by the heating control unit 2 so that the heating chamber 3 was heated up to 150° C. or higher, and the heating was continued until $^{64}$NiO put into the heating chamber 3 could be completely dissolved. After $^{64}$NiO was completely dissolved, the heating chamber 3 was heated up to 200° C. or higher by the heating apparatus 1 so that the $^{64}$NiO dissolved solution was vaporized. The vaporized acid was trapped by the acid trapping part 8 formed of a basic substance such as soda lime or the like to prevent acid leakage to the outside. Subsequently, 0.1 mol/L of hydrochloric acid was added to the heating chamber 3 from the solvent reservoir 4b via the three-way valve 9 to completely dissolve the solid (nickel chloride (NiCl$_2$)) remaining in the heating chamber 3, and via the three-way valves 9 and 10, the dissolved solution was added under pressure to the separation unit 6 composed of a chelate exchange column 6a filled with a chelating-ion exchange resin (GL Science's Inert Sep Mini ME-1) (coordinating group: iminodiacetic acid group, matrix: methacrylate polymer), and a solid phase extraction column 6b. Accordingly, nickel, radioactive copper and radioactive cobalt contained in the dissolved solution were made to be held by the chelating resin. The solid phase extraction column 6b is for removing the chelate moiety (organic compound) that could be eluted under an acidic condition. For example, the chelate moiety would have a risk of acting as an inhibitor in production of radioactive copper-labeled chemical reagents, and therefore must be removed in this stage.

After the hydrochloric acid solution had been led to pass through the separation unit 6, 0.1 mol/L of hydrochloric acid was led under pressure to pass through the separation unit 6 from the solvent reservoir 4b via the three-way valves 9 and 10, to thereby elute nickel and radioactive cobalt. The nickel and radioactive cobalt eluate was made to return under pressure to the heat chamber 3 via the three-way valves 12 and 11.

Next, 2 mol/L of hydrochloric acid was introduced under pressure into the separation unit 6 from the solvent reservoir 4c via the three-way valve 10, to thereby elute radioactive copper. The radioactive copper eluate was transferred into the chamber 5 under pressure via the three-way vales 12 and 13, and the radioactive copper was thus collected therein. The chamber 5 has the same constitution as that of the heating chamber 3 except that its bottom is not V-shaped, as shown in FIG. 3(b).

As described in the above, according to the invention, it has been confirmed that rapid separation is possible in the separation apparatus of FIG. 2, for example, high-purity radioactive copper can be separated within 2 hours or so. In addition, it has also been confirmed that the separation apparatus can be down-sized to a small scale.

Example 2

Using hydrochloric acid having a different concentration, adsorption and elution of nickel, radioactive cobalt and radioactive copper to and from a chelating-ion exchange resin-filled column was investigated. The chelating-ion exchange resin-filled column used here was the same as in Example 1.

The experiment was as follows: Hydrochloric acid containing nickel, radioactive cobalt and radioactive copper and having a different concentration of 6 types of 0.01 M, 0.03 M, 0.06 M, 0.1 M, 0.15 M and 0.25 M was prepared, and the individual elements contained therein were computed in terms of the elution rate thereof per mL of the solution (radioactivity level of fraction/total radioactivity level×100) and the residual ratio thereof in the column. The test results of every element are shown in Table 1 and Table 2. The numerical value on the right side in the row of "column" in the Tables indicates the residual ratio (%) of the element in the column.

TABLE 1

| | | Abundance Ratio (%) | | | | | |
|---|---|---|---|---|---|---|---|
| | | 0.01M | 0.03M | 0.06M | 0.1M | 0.15M | 0.25M |
| | Solvent Amount | | | | | | |
| $^{57}$Ni | 1 | 0 | 30.29 | 38.63 | 26.03 | 0 | 31.32 |
| | 2 | 0 | 57.67 | 54.97 | 51.91 | 97.99 | 64.70 |
| | 3 | 0 | 3.52 | 4.66 | 18.91 | 1.83 | 3.60 |
| | 4 | 0 | 2.17 | 0.975 | 1.51 | 0.175 | 0.315 |
| | 5 | 0 | 1.69 | 0.416 | 0.889 | 0 | 0.071 |
| | 6 | 0 | 1.28 | 0.149 | 0.219 | 0 | 0 |
| | 7 | 0 | 0.886 | 0 | 0.007 | 0 | 0 |
| | Column | 100.00 | 2.50 | 0.196 | 0 | 0 | 0 |
| | Solvent Amount (mL) | | | | | | |
| $^{55}$Co | 1 | 0.00 | 37.52 | 41.62 | 28.38 | 0.00 | 30.89 |
| | 2 | 0.00 | 59.30 | 55.62 | 49.44 | 87.52 | 65.41 |

TABLE 1-continued

| | Abundance Ratio (%) | | | | | |
|---|---|---|---|---|---|---|
| | 0.01M | 0.03M | 0.06M | 0.1M | 0.15M | 0.25M |
| 3 | 0.00 | 1.69 | 2.59 | 20.54 | 0.82 | 3.28 |
| 4 | 0.00 | 0.17 | 0.09 | 0.72 | 0.06 | 0.25 |
| 5 | 0.00 | 0.00 | 0.04 | 0.49 | 0.02 | 0.06 |
| 6 | 0.00 | 0.00 | 0.00 | 0.10 | 0.02 | 0.04 |
| 7 | 0.00 | 0.00 | 0.00 | 0.00 | 0.00 | 0.01 |
| Column | 100.00 | 1.32 | 0.04 | 0.00 | 0.02 | 0.05 |

TABLE 2

| | $^{64}$Cu | | | | |
|---|---|---|---|---|---|
| Solvent | Abundance Ratio (%) | | | | |
| Amount | 0.1M | 0.15M | 0.25M | 0.5M | 1M |
| 1 | 0.00 | 0.00 | 0.00 | 1.70 | 47.55 |
| 2 | 0.00 | 0.00 | 0.00 | 20.40 | 49.64 |
| 3 | 0.00 | 0.00 | 0.00 | 19.30 | 2.33 |
| 4 | 0.00 | 0.00 | 5.36 | 11.70 | 0.00 |
| 5 | 0.00 | 0.00 | 8.12 | 4.40 | 0.00 |
| 6 | 0.00 | 0.00 | 9.94 | 2.50 | 0.00 |
| 7 | 0.00 | 0.00 | 0.50 | 1.50 | 0.00 |
| Column | 100.00 | 100.00 | 76.08 | 0.60 | 0.00 |

The above results confirmed that the concentration range of hydrochloric acid in which almost all nickel and radioactive cobalt could elute with little residue in the column, or that is, the concentration range of hydrochloric acid suitable for selective separation of nickel and radioactive cobalt is from 0.06 to 0.25 M. However, at 0.25 M or therearound, radioactive copper also eluted almost simultaneously with nickel and radioactive cobalt, and there is a possibility that the separation efficiency of radioactive copper may lower. Accordingly, it has been confirmed that, for elution of nickel and radioactive cobalt, the hydrochloric acid concentration is preferably from 0.06 to 0.15 M, most preferably 0.1 M. It has also been confirmed that, for elution of radioactive copper, the hydrochloric acid concentration is preferably at least 0.5 M.

When nitric acid is used in place of hydrochloric acid, the preferred concentration condition thereof is the same as the above-mentioned hydrochloric acid concentration condition. When sulfuric acid is used, the preferred concentration condition for elution of nickel and radioactive cobalt is from 0.025 to 0.075 M, most preferably 0.05 M, and for elution of radioactive copper, its concentration is preferably at least 0.25 M.

INDUSTRIAL APPLICABILITY

According to the invention, high-purity radioactive copper such as Cu-60, Cu-61, Cu-62, Cu-64, Cu-67 or the like can be separated in 2 hours or so, and the invention enables rapid separation. By utilizing the invention, a small-scale separation apparatus can be employed, and the limitation of apparatus installation inside the cell for brocking radiation may be loosened more, and the invention is effective for protecting workers engaged in radioactive copper production from being exposed to radioactivity.

Radioactive copper is a radioactive isotope widely utilized in the field of medicine such as diagnosis or radionuclide therapy, and is useful also as a tracer in plant studies, and therefore its use in clinical practice and in RI production facilities is expected.

The invention claimed is:

1. A method for separating radioactive copper from nickel that contains radioactive copper and radioactive cobalt, which comprises dissolving nickel that contains radioactive copper and radioactive cobalt in a first acid solution to form a resultant solution, passing the resultant solution through a chelating-ion exchange resin-filled column to thereby hold the nickel, radioactive copper and radioactive cobalt on the chelating-ion exchange resin, then passing a second acid solution through the chelating-ion exchange resin-filled column to elute nickel and radioactive cobalt, and thereafter passing a third acid solution having a higher concentration than that of the second acid solution through the chelating-ion exchange resin-filled column after nickel and radioactive cobalt have been eluted therefrom to thereby elute radioactive copper, wherein the chelating-ion exchange resin has an iminodiacetic acid group as a coordinating group, wherein the first acid solution and the second acid solution are hydrochloric acid or nitric acid of from 0.15 to 0.1 mol/L, or sulfuric acid of from 0.07 to 0.05 mol/L, and wherein the third acid solution is hydrochloric acid or nitric acid having a concentration of at least 0.5 mol/L, or sulfuric acid having a concentration of at least 0.25 mol/L.

* * * * *